Figure 6:
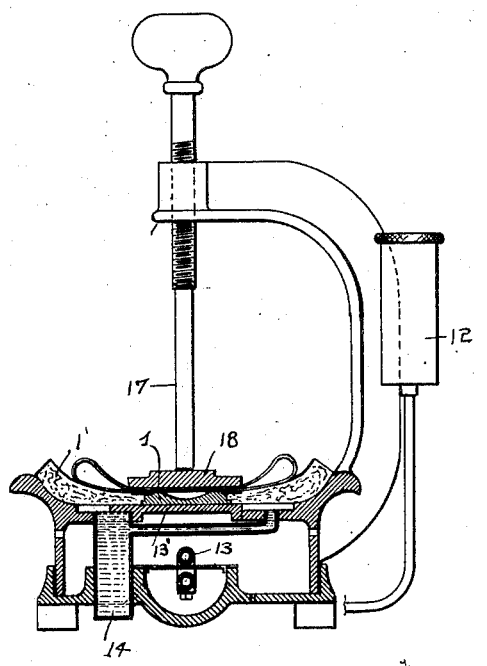

J. E. BANCROFT.
VULCANIZING DEVICE.
APPLICATION FILED JULY 5, 1910.
1,082,258.
Patented Dec. 23, 1913.
2 SHEETS—SHEET 1.
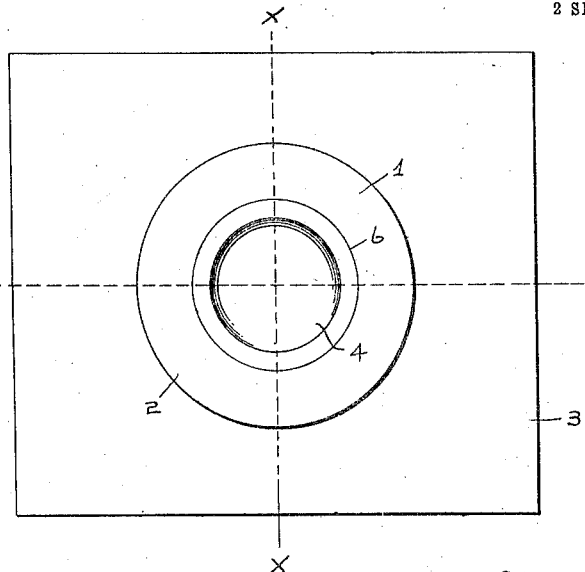
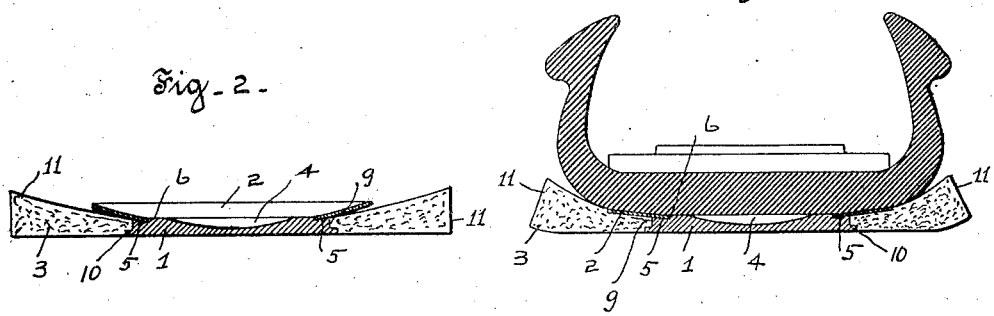
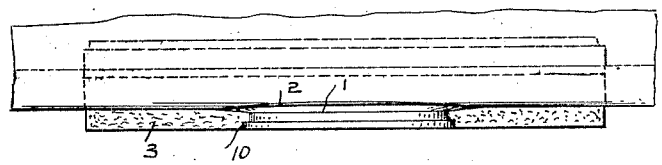
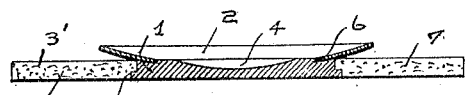
Witnesses
E. R. Douglas
F. C. Wirth
Inventor
James E. Bancroft
By Wm. L. Terry Atty

J. E. BANCROFT.
VULCANIZING DEVICE.
APPLICATION FILED JULY 5, 1910.

1,082,258.

Patented Dec. 23, 1913.
2 SHEETS—SHEET 2.

UNITED STATES PATENT OFFICE.

JAMES E. BANCROFT, OF TOLEDO, OHIO, ASSIGNOR TO TOLEDO COMPUTING SCALE COMPANY, OF NEWARK, NEW JERSEY, A CORPORATION OF NEW JERSEY.

VULCANIZING DEVICE.

1,082,258.  Specification of Letters Patent.  Patented Dec. 23, 1913.

Application filed July 5, 1910. Serial No. 570,317.

*To all whom it may concern:*

Be it known that I, JAMES E. BANCROFT, a citizen of the United States, residing at No. 665 Spring street, Toledo, in the county of Lucas and State of Ohio, have invented a new and useful Vulcanizing Device, of which the following is a specification.

My invention relates to vulcanizing especially repairs to tires and has for its object to provide a vulcanizing pad so adapted, that those unskilled in repairing tires can by the use of my pad, in connection with any thermal means, adapted for such purpose, readily effect the vulcanizing of repair patches to any kind of rubber tires, without injury to the sound portions of the tire which border the patch to be repaired and without damage to such other sound portions of the tire as overlap from a vulcanizer.

The object of my invention is accomplished as hereinafter described and illustrated in the drawings in which—

Figure 7:
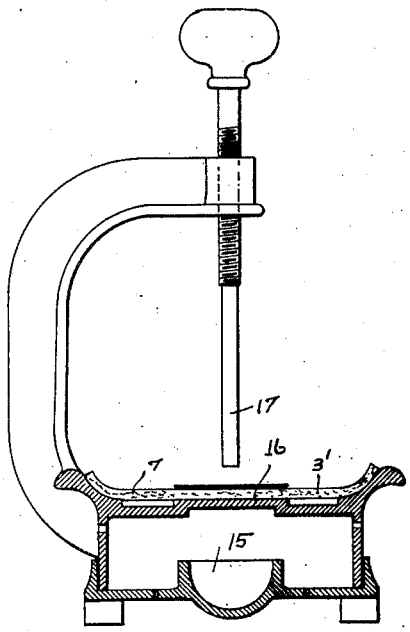
Figure 8:
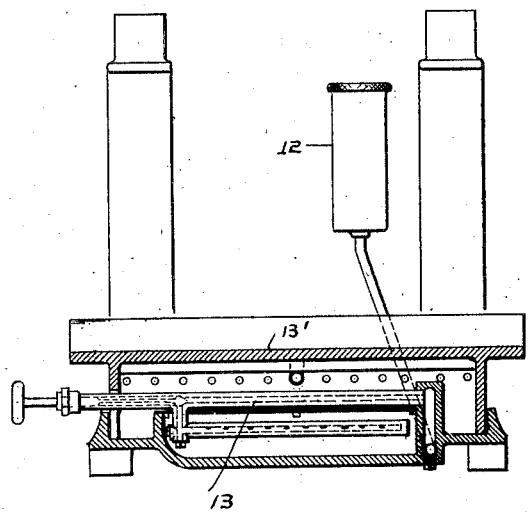

Figure 1 is a top plan view of a vulcanizing pad constructed in accordance with my invention; Fig. 2 is a cross section on the line $x$—$x$ of Fig. 1, showing the flexible metallic rim in the normal position; Fig. 3 is a like view showing a tire casing in position on the pad and the metallic rim bearing thereon; Fig. 4 is a view in longitudinal central section of the pad applied to a tire, a fragmentary portion of the latter being shown in elevation, the metallic part of the pad, however, being omitted; Fig. 5 is also a transverse section through the pad modified by the use of an absorbent fabric of even thickness; Fig. 6 is a transverse section showing the pad together with inner tube in position upon the thermal plate of a vulcanizer, which is provided with a reservoir of fixed capacity and caloric agent as to effect no more than vulcanizing the repair patch and a contiguous water chamber to supply steam to the absorbent fabric and having a capacity to exhaust its contents with or after the exhaust of the caloric agent; Fig. 7 is also a transverse section of a vulcanizer in the construction of which the water chamber is omitted, and thereby necessitating saturation of the pad, shown in end elevation, by dipping it in water before it is placed upon the thermal plate of this vulcanizer; Fig. 8 is a longitudinal section of a vulcanizer shown in Fig. 6 showing the burner.

The vulcanizing pad of my invention comprises a heat-confining device, heat-conducting element, or rigid thermal plate 1, which is surrounded by an independent or attachable flexible metallic rim 2, of some width and a pad body 3 of porous or permeable material in the area of which the thermal plate 1 with its flexible rim 2 are preferably centrally located. The thermal plate 1 of the pad is also made of metal or of any other substance which is a good conductor of heat and is formed with a top indentation 4. Said indentation is preferably in the form of a segment of a sphere, but may be made of any suitable shape and its bottom lettered or decorated for trademarks. Said indentation 4 is made of a capacity to receive the material required for the repair patch, or rather the patched or cemented tire, and may more or less nearly approximate to a plane. The top margin of the thermal plate 1 is preferably rabbeted to provide a shoulder 5 for the support of marginal rim 2 and also locate its top flush with the top of the thermal plate. The bore 6 of the rim is of an area permitting the rim being telescoped and brought to bear upon the shoulder 5. To secure the rim to the thermal plate 1, the top edge of the bore through the rim is beveled to provide a gap into which metal from the top is peened to formed a dovetail clench for the rim. However, other suitable methods of securing the rim to the plate may be employed. The rim 2 is made of flexible metal and is made concave to locate its largest outer margin a suitable distance above the top of the thermal plate and conjointly therewith form a shallow, saucer-like receiver for that portion of a tire, which is to be repaired. For the body 3 of the pad I employ a more or less pliable composition or a material or a fabric, which is adapted to absorb water and permit its diffusion as vapor upon application of heat or that will permit the diffusion of water vapors supplied thereto. I have found that asbestos fabric possesses these requisites and have employed said substance as material very suitable for my purpose, it being also of a refractory nature. The area of the diffusing portion of the pad is such as to well cover the top or thermal plate of a vulcanizer. The diffusing portion of the pad is also provided with a central opening of a size to receive the upper portion 9 of the thermal plate 1, before the rim 2 is attached thereto. The body of the pad in position rests upon the shoulder 10, which is integral with the base of the plate 1, in which position the material of the pad body is compressed between the shoulder and the rim, when the latter is secured to the thermal plate 1. The sides of the pad are also preferably thicker to provide side rolls 11 to more thoroughly protect the sides of tires. A pad thus constructed and with roll sides, is preferably used in connection with a vulcanizer illustrated in Fig. 6. Said vulcanizer comprises a reservoir 12 of a capacity to provide sufficient caloric means to vulcanize a tire or tube. Said caloric means is utilized in a burner 13, the flames of which impinge upon the thermal plate 13' of the vulcanizer body and evaporate the contents of a water reservoir 14 contiguous to the burner. Said water reservoir is so ported as to discharge water vapors at spaced points into the diffusing body 3 of the vulcanizing pad 1 and has a capacity to provide a volume of water that will exhaust with or after the exhaust of the required fuel.

In the vulcanizer shown in Fig. 7 the water chamber is omitted and heating means are introduced into a pan 15. With a vulcanizer of this kind the pad 7 illustrated in Fig. 5 is used. The body 3' of said pad is of even thickness and is dipped into water or is filled to saturation. The water held within the interstices and pores of the pad is evaporated when heat is applied to the thermal plate 16 of this vulcanizer and provided the requisite amount of vapors. The vulcanizers are each provided with a pressure bar 17 and with a pressure distributing plate 18 by means of which the tire or tubes interposed between a pressure plate and a pad are clamped to the vulcanizer with the respective thermal plates in intimate contact. The pressure exerted by the clamp bars effects a distortion of the flexible rim of the saucer-like thermal plate, depressing the rim of the plate lengthwise of the tire or tube and raising the edge portions of this flexible metallic rim 2 along the sides of the tire or tube, and thereby is provided an intimate flexible metallic compress around that portion of the tire which is to be repaired by a patch. With a tire or tube in this position upon my pad and clamped to a vlucanizer with the depressions of the pad filled with material required for a patch, or rather with the already patched or cemented portion of the material to be vulcanized disposed in the heat-confining area, the vapors of water produced by the application of heat will diffuse through the pad and escape along the margins of the pad 3 or 3' and in so escaping enshroud the tire or tube with vapor to protect its material against heat escaping around the sides of either one of the vulcanizers. The water vaporizes from the container into the body of the pad and the latter being extremely pervious is penetrated throughout by the moisture which condenses among its fibers and soaks and spreads throughout the absorbent pad. The pad, however, being exposed to the atmosphere is maintained below the temperature corresponding to the vaporizing point in the atmosphere, to-wit 212° Fahrenheit, so that if a slight excess of heat is supplied by the burner to the thermal plate it is taken up in vaporizing the condensed water in the pad, the latter being in contact with the plate. It will be apparent also that the pad being directly in contact with the body of the material being vulcanized around the patch and comparatively close thereto, the tire or other body being vulcanized is absolutely protected at points beyond the conducting plate or body. Furthermore, the conducting plate itself is prevented from getting too hot not only by contact with the moist pad but by reason of the circulation of vapors from the pad about the plate and moreover an amount of moisture which I find desirable in vulcanizing is supplied to the patch.

My pad may be also used in connection with thermo-electric vulcanizers or any vulcanizer adapted to apply heat in spots to repair rubber fabric or attach patches thereto.

When my pad is used in connection with a vulcanizer which does not supply moisture it may be dipped in water as heretofore explained and the moisture acts to keep the temperature thereof below the boiling point of water.

I claim:

1. A vulcanizing pad comprising a patch plate, a dished rim projecting from said plate and a pliable body around said patch plate and rim.

2. A vulcanizing pad, comprising a patch plate having a cavity to receive the material for a patch and having an overhanging rim, and a pliable fabric around said patch plate.

3. A vulcanizing pad, comprising a patch plate having a cavity to receive the material for a patch and having an overhanging rim of metal yieldable under pressure, and a pad body of absorbent fabric.

4. A vulcanizer pad, comprising a pad body of an absorbent fabric, a plate located centrally to the pad having a top indentation adapted to receive the material for a patch and having a projecting rim yielding to the tire or tube pressed thereon.

5. A vulcanizer pad, comprising a pad body of a material or substance adapted to diffuse vapors of water delivered thereto, and a heating plate having a flexible upturned rim yielding to clamping pressure.

6. A vulcanizer pad comprising a pad body of a refractory substance having capillary pores and of pliable nature, a rigid heating plate disposed centrally in the body of the pad, having a patch cavity and a flexible rim overlapping the body of the pad and upturned therefrom.

7. A vulcanizer pad, comprising a pad body of pliable material having capillary openings, a patch plate centrally disposed of the body of the pad, having a shoulder for the support of the bottom of the pad, and a cupped metallic rim coupled thereto to secure the body of the pad to the plate.

8. A vulcanizer pad comprising a pad body adapted to be saturated with a fixed volume of water having a centrally disposed patch plate provided with a cupped rim of yieldable metal and forming conjointly with the patch plate, a shallow saucer-like receptacle for the patch portion of a tube or tire and having its rim normally disposed above the body of the patch.

9. A vulcanizer pad comprising a pad body composed of loosely intermeshed but coherent fabric, imposable upon the thermal top of a vulcanizer, a patch container centrally disposed of the pad and bearing upon the thermal top of the vulcanizer and having an upturned rim, yieldable to applied pressure.

10. A vulcanizer pad comprising a substantially rigid heat-conducting element provided with a flexible heat conducting flange.

JAMES E. BANCROFT.

Witnesses:
 Wm. K. Terry,
 F. C. Wirth.

---

Copies of this patent may be obtained for five cents each, by addressing the "Commissioner of Patents, Washington, D. C."